US012195962B2

(12) United States Patent
Sauriol

(10) Patent No.: US 12,195,962 B2
(45) Date of Patent: Jan. 14, 2025

(54) RETRACTABLE ROOF WITH HINGED FOLDING PANEL STRUCTURES SUSPENDED WITH CABLES

(71) Applicant: Frédéric Sauriol, Montréal (CA)

(72) Inventor: Frédéric Sauriol, Montréal (CA)

(*) Notice: Subject to any disclaimer, the term of this patent is extended or adjusted under 35 U.S.C. 154(b) by 106 days.

(21) Appl. No.: 17/908,302

(22) PCT Filed: Mar. 4, 2021

(86) PCT No.: PCT/CA2021/000013
§ 371 (c)(1),
(2) Date: Aug. 31, 2022

(87) PCT Pub. No.: WO2021/174334
PCT Pub. Date: Sep. 10, 2021

(65) Prior Publication Data

US 2023/0086435 A1 Mar. 23, 2023

Related U.S. Application Data

(60) Provisional application No. 62/984,842, filed on Mar. 4, 2020.

(51) Int. Cl.
*E04B 7/14* (2006.01)
*B66D 1/74* (2006.01)
(Continued)

(52) U.S. Cl.
CPC ............ *E04B 7/163* (2013.01); *B66D 1/7489* (2013.01); *E04B 1/342* (2013.01); *E04B 7/102* (2013.01); *E04B 7/14* (2013.01); *B66D 1/7405* (2013.01)

(58) Field of Classification Search
CPC ... E04B 7/08; E04B 7/10; E04B 7/102; E04B 7/105; E04B 7/107; E04B 7/14;
(Continued)

(56) References Cited

U.S. PATENT DOCUMENTS 3,676,964 A * 7/1972 Anglade, Jr. ......... E04B 1/3205 52/745.07
4,587,775 A 5/1986 Lewis et al.
(Continued)

FOREIGN PATENT DOCUMENTS

CA 2720796 A1 5/2012
CA 2720822 A1 5/2012
(Continued)

*Primary Examiner* — Kyle J. Walraed-Sullivan
(74) *Attorney, Agent, or Firm* — PRAXIS

(57) ABSTRACT

A retractable roof for a building having a supporting frame and a high structure extending vertically above the supporting frame. The roof has at least one structure section with first and second panels. The first panel is hingeably mounted on the supporting frame at a proximal hinge and the second panel is hingeably mounted on the first panel at a distal hinge. A distal end of the second panel is suspended to the high structure with a distal cable connected to a distal motorized winch. A tackle member connects to both first and second panels adjacent the proximal hinge and the distal end, respectively, and includes a tackle wire that forms a wire side of a triangular cross-sectional shape with the first and second panels. The tackle wire connects to a winch mechanism to control a length of the wire side.

12 Claims, 16 Drawing Sheets

(51) Int. Cl.
*E04B 1/342* (2006.01)
*E04B 7/10* (2006.01)
*E04B 7/16* (2006.01)

(58) Field of Classification Search
CPC . E04B 7/16; E04B 7/163; E04B 7/166; E04H 2003/142; E04H 3/14; E04H 3/165
USPC .................................................... 52/66, 6, 83
See application file for complete search history.

(56) References Cited

U.S. PATENT DOCUMENTS

| | | | | | |
|---|---|---|---|---|---|
| 4,682,449 | A * | 7/1987 | Berger | E04B 7/166 | 52/64 |
| 4,727,688 | A | 3/1988 | Kida et al. | | |
| 5,024,031 | A * | 6/1991 | Hoberman | E04B 1/3441 | 52/109 |
| 5,062,243 | A | 11/1991 | Kumagai | | |
| 5,351,449 | A * | 10/1994 | Allen | E04H 3/165 | 52/6 |
| 5,355,641 | A * | 10/1994 | Levy | E04B 7/163 | 52/6 |
| 5,653,066 | A | 8/1997 | Schildge, Jr. | | |
| 5,655,335 | A * | 8/1997 | Vermeer | E04B 7/163 | 52/13 |
| 5,904,003 | A * | 5/1999 | Stephen | E04B 7/166 | 52/6 |
| 6,003,269 | A * | 12/1999 | McRee | E04H 3/165 | 52/63 |
| 6,026,614 | A * | 2/2000 | Johnston | E04B 7/14 | 52/83 |
| 6,065,252 | A * | 5/2000 | Norsen | E06B 3/80 | 52/6 |
| 6,754,994 | B2 | 6/2004 | Jahanpour | | |
| 6,874,275 | B2 * | 4/2005 | Saether | A01G 7/045 | 362/403 |
| 7,637,060 | B2 * | 12/2009 | Starheim | E06B 3/7007 | 296/183.1 |
| 8,635,813 | B2 | 1/2014 | Delaney | | |
| 2002/0129565 | A1 * | 9/2002 | Silberman | E04H 3/14 | 52/66 |
| 2003/0046879 | A1 * | 3/2003 | Jahanpour | E04B 7/166 | 52/6 |
| 2003/0097801 | A1 * | 5/2003 | Hoberman | E04H 15/50 | 52/3 |
| 2004/0261953 | A1 * | 12/2004 | Hart | F24F 5/0035 | 160/80 |
| 2009/0044459 | A1 * | 2/2009 | Kolozsvary-Kiss | E04B 7/14 | 52/63 |
| 2011/0107688 | A1 * | 5/2011 | Delaney | E04B 7/166 | 52/66 |
| 2011/0162294 | A1 * | 7/2011 | Li | E04B 7/14 | 52/223.13 |
| 2012/0131858 | A1 * | 5/2012 | Hosking | A47C 1/121 | 52/6 |
| 2012/0131859 | A1 * | 5/2012 | Hosking | A47C 7/744 | 52/6 |
| 2012/0131860 | A1 * | 5/2012 | Hosking | E04H 3/14 | 52/173.1 |
| 2012/0135673 | A1 * | 5/2012 | Hosking | A47C 1/121 | 454/199 |
| 2021/0340763 | A1 * | 11/2021 | Golozar | E04B 1/344 | |
| 2023/0349146 | A1 * | 11/2023 | Vasconi | B64U 70/90 | |

FOREIGN PATENT DOCUMENTS

| | | | | |
|---|---|---|---|---|
| CH | 688593 | A5 * | 11/1997 | E04B 7/166 |
| CN | 103883058 | A | 6/2014 | |
| WO | 2012024781 | A2 | 3/2012 | |

* cited by examiner

RETRACTABLE ROOF WITH HINGED FOLDING PANEL STRUCTURES SUSPENDED WITH CABLES

CROSS REFERENCE TO RELATED APPLICATIONS

The present application claims the benefit of U.S. provisional patent application No. 62/984,842, filed on Mar. 4, 2020, and which is incorporated herein by reference.

FIELD OF THE INVENTION

The present invention relates to the field of buildings, and is more particularly concerned with a lightweight retractable roof with hinged folding panel structures suspended with cables for large buildings as stadiums and the like.

BACKGROUND OF THE INVENTION

It is well known in the art of buildings such as stadiums and the like to have a roof to protect the playing field against the elements and to allow their use even when bad weather conditions. Some of these roofs are openable and closable via a deployable flexible canvas or the like using a supporting cable arrangement, or a slidable roof (or sections thereof) moving along rails or the like. These types of retractable roofs are usually not capable of supporting heavy snow falls (especially canvas type) while being of relatively light weight structure.

Accordingly, there is a need for an improved retractable roof for use in large buildings and the like.

SUMMARY OF THE INVENTION

It is therefore a general object of the present invention to provide an improved retractable roof for use in large buildings to obviate the above-mentioned problems.

An advantage of the present invention is that the retractable roof is easily retrofitted or implemented onto the opened roof of an existing building.

Another advantage of the present invention is that the retractable roof is relatively light weight as being made out of a truss panel simply covered with a canvas or light rigid panels, or being made of monocoque or semi-monocoque structure. It could also be made of light and strong composite material.

A further advantage of the present invention is that the retractable roof is rapidly opened or closed whenever required.

Still another advantage of the present invention is that the retractable roof can be divided in a plurality of sections positioned side-by-side relative to one another, with each section being individually retractable.

Yet another advantage of the present invention is that the retractable roof, or each section thereof, is made of two panel structures hingeably connected to one another, with one panel structure being hingeably mounted on a building supporting frame and the other panel structure being suspended by at least one, but preferably two cables to a high structure. The two panel structures are also connected to each other via a tackle wire. A motor winds the tackle wire to open the roof (or section thereof) while the cables retain the roof (or section thereof) to simply support it. The cables are used to initiate the closing of the roof (or section thereof) while simply supporting the latter in the last portion of the closing displacement.

Yet a further advantage of the present invention is that the retractable roof, or each section thereof, is entirely opened or closed in only few minutes.

Yet a further advantage of the present invention is that the retractable roof, or each section thereof, is that the weight/load (including external loads) thereof can be mainly (80% or more, depending on the specific case) carried/supported by the high structure, via the end cables, in all and every positions of the roof, even during the entire opening or closing sequences of the roof.

According to an aspect of the present invention there is provided a retractable roof for a building having a supporting frame and a high structure extending vertically above the supporting frame, said retractable roof comprising:

- at least one structure section including first and second panel structures, said first panel structure having a first proximal end being hingeably mountable on the supporting frame at a proximal hinge member and a first distal end hingeably connecting to a second proximal end of the second panel structure at a distal hinge member, a second distal end of said second panel structure being suspended to the high structure with a distal end cable connected to a distal motorized winch member;
- a tackle member connecting to both said first and second panel structures of said at least one structure section adjacent said first proximal end and said second distal end, respectively, and including a tackle wire forming a wire side of a triangular cross-sectional shape with said first and second panel structures; and
- a winch mechanism connecting to the tackle member to control a wire length of the wire side.

In one embodiment, the retractable roof further includes one of said first distal end and second proximal end being independently suspended to the high structure with a proximal end cable connected to a proximal motorized winch member.

Conveniently, the second proximal end is independently suspended to the high structure with the proximal end cable.

one embodiment, the retractable roof further includes a punch member mounted on one of said first and second panel structures, said punch member selectively abutting to and dividing (or folding) said tackle member into first and second angled portions so as to maintain a minimum predetermined internal distal angle of said triangular shape between the tackle wire and the distal panel structure.

Conveniently, the minimum predetermined internal distal angle between the tackle wire and the distal panel structure is at least ten (10) degrees.

Alternatively, the punch member is hingeably mounted on said distal hinge member.

Conveniently, the punch member includes a biasing member biasing said punch member towards said first panel structure.

Conveniently, the punch member includes a stop member stopping displacement of said punch member under via said biasing member when said punch member engages said tackle wire.

In one embodiment, the first and second panel structure extend generally side-by-side to one another when the retractable roof is in a roof closed configuration, and (fold generally) on top of one another when the retractable roof is in a roof opened configuration.

Conveniently, the wire length of said wire side of said tackle wire, along with respective proximal and distal tensions in said proximal and distal end cables and proximal and distal lengths of said proximal and distal end cables control displacement and dynamic stability of said first and second panel structures between said roof closed and opened configurations, and static stability of said first and second panel structures at said roof closed and opened configurations.

In one embodiment, the retractable roof includes a plurality of structure sections positioned adjacent one another to form said retractable roof.

Conveniently, adjacent ones of said plurality of structure sections partially overlap one another to ensure sealing of the retractable roof.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

Figure 1:
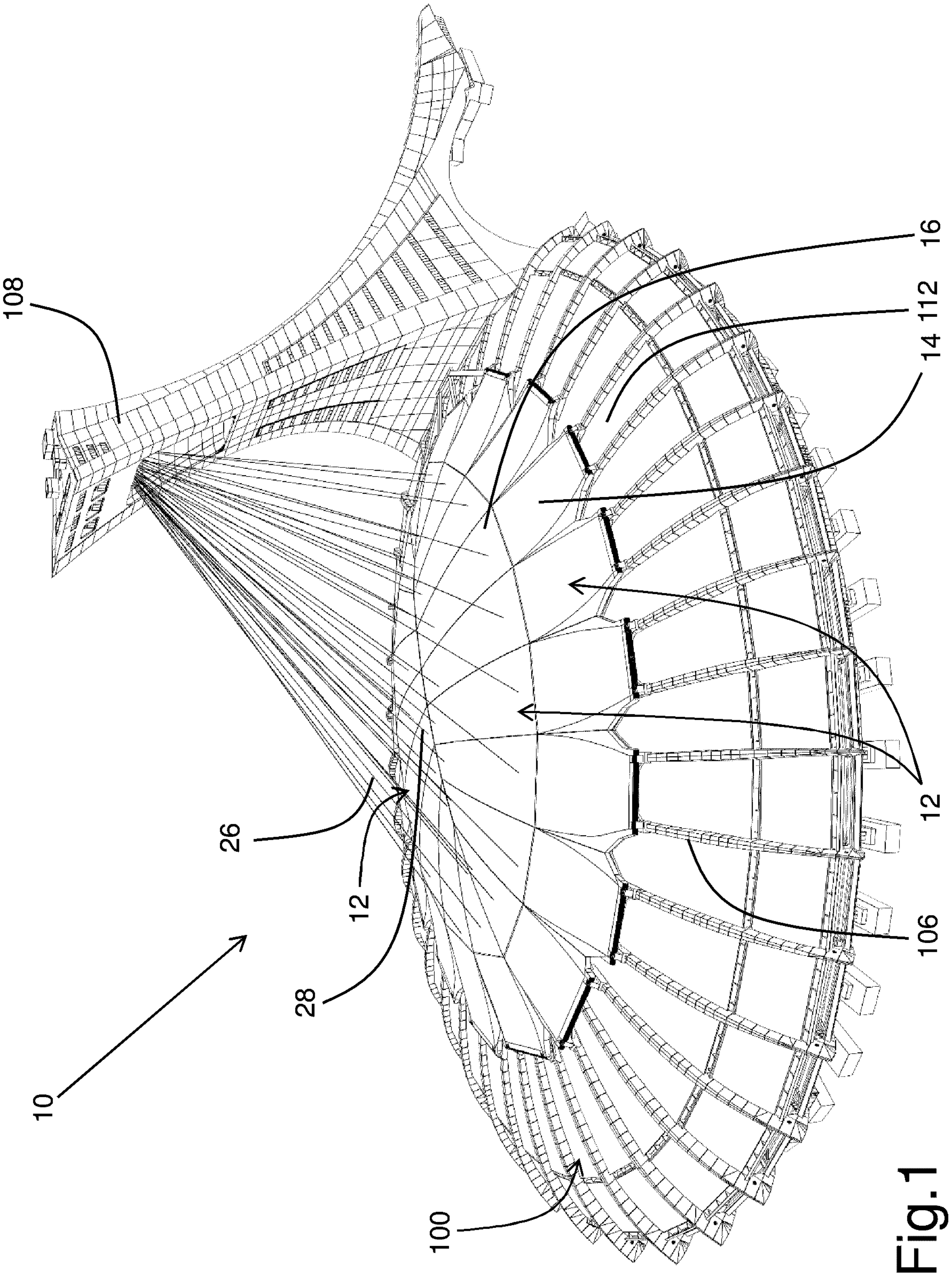
FIG. 1 is a pictorial top perspective view of a retractable roof in accordance with an embodiment of the present invention, in a roof closed configuration on a stadium.
Figure 2:
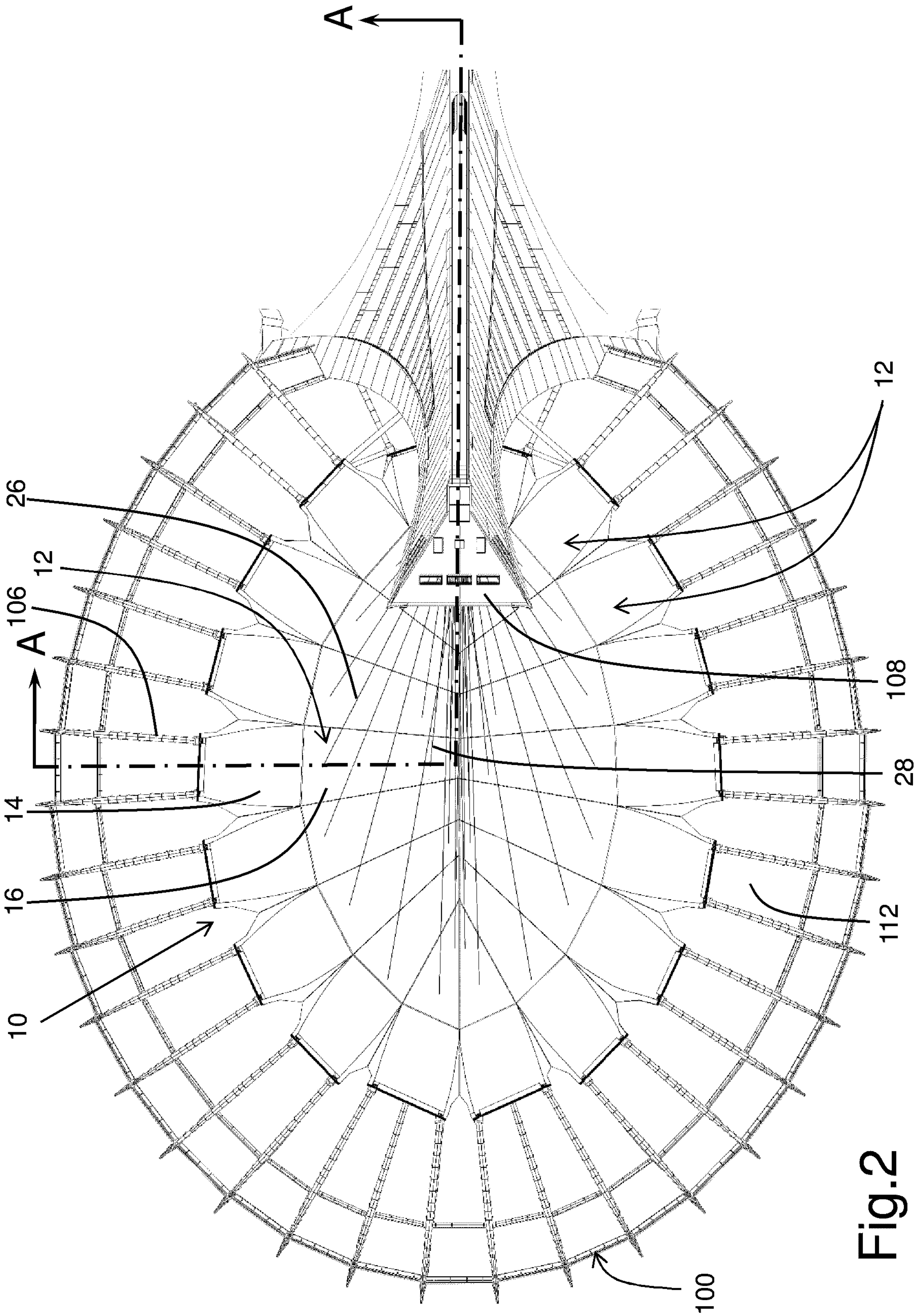
FIG. 2 is a pictorial top plan view of the embodiment of FIG. 1.

With reference to the annexed drawings the preferred embodiment of the present invention will be herein described for indicative purpose and by no means as of limitation.

Referring to FIGS. 1 to 16, there is shown a retractable roof in accordance with an embodiment 10 of the present invention, typically for use in large buildings 100 such as stadiums and the like, over a playing field 102 (a baseball diamond field shown), the grandstands 104 and the like as a protection against the elements, whenever desired and/or needed. In the Figures of the present embodiment, the stadium is 100 a representation of the Olympic Stadium of Montreal, Québec, Canada that was built for the 1976 Olympic Summer Games (as best seen in FIGS. 1-5), but any other building structure, or simply a structure, could be considered without departing from the scope of the present invention.

The retractable roof 10 is typically mounted on a supporting frame 106, such as an existing permanent roof structure or the like, and is also typically supported by a high structure 108 extending vertically above the supporting frame 106, such as a mast, a tower or the like, or an arrangement thereof. The illustrated present embodiment of the retractable roof 10 is mounted on the existing cantilever horizontal beams 106 made of a plurality of adjacent voussoirs 106' of the different consoles 110 forming the permanent roof 112 overhanging the grandstands 104 of the stadium 100. In the illustrated embodiment, the retractable roof 10 essentially closes off the central opening existing in the existing permanent roof 112 when in the closed configuration (see FIGS. 1 and 2), while keeping that central opening uncovered when in the opened configuration (see FIGS. 4 and 5).

The retractable roof 10, although mounted on the consoles 110, is mainly supported by the inclined tower 108, via the proximal 26 and distal 28 end cables, as detailed hereinafter. The retractable roof 10 typically includes at least one, but preferably a plurality of structure sections 12 (eighteen (18) shown in FIGS. 1-5) positioned adjacent one another to form the retractable roof 10, with each structure section 12 being independently retractable.

Each structure section 12 typically includes first 14 and second 16 panel structures. The first or proximal panel structure 14 has a first proximal end 18 hingeably mounted on the supporting frame 106 at a proximal axis 48 and a first distal end 20 hingeably connected to a second proximal end 22 of the second panel structure 16 at a distal axis 50. The second distal end 24 of the second panel structure 16 is typically suspended to the high structure 108 with a distal end cable 28. Optionally, especially when the distal axis 50 passes over (in a horizontal plane, or horizontally, from one side to the other) the proximal axis 48 (as further detailed hereinbelow), one of the first distal end 20 and the second proximal end 22, preferably the second proximal end 22 is typically independently suspended to the high structure 108 with a proximal end cable 26.

A tackle member 30 connects to both the first 14 and second 16 panel structures, typically at respective free rollers or pulleys 31, 33 or the like and adjacent the first proximal end 18 and the second distal end 24, respectively, for increased mechanical efficiency. The tackle member 30 forms a variable (lengthwise) wire side 32 of a triangular cross-sectional shape of the section 12, along with the first 14 and second 16 panel structures. A motor/winch mechanism 34, preferably mounted onto the first panel structure 14, connects to the tackle member 30 to control a wire length of the wire side 32 made of a plurality of passes of a tackle wire 35.

Each structure section 12, especially when both first and second panel structures 14, 16 are close to be aligned with one another (or extend generally side-by-side to one another) in the closed configuration, typically further includes a crossbow punch member 36 mounted on one of the first 14 and second 16 panel structures adjacent the other one, preferably at the distal axis 50. The punch member 36 selectively abuts to (or engages) and divides (or partially folds) the tackle wire 35 into first 38 and second 40 angled portions or segments so as to prevent the first 14 and second 16 panel structures to align with one another while keeping an internal distal angle A (of the triangular shape) between the tackle wire 35 and the distal panel structure 16 larger than a predetermined minimum value of about ten (10) degrees, and preferably larger than about fifteen (15) degrees. It is noted that the term crossbow is used as it refers to the fact that the punch member 36 acts in a similar way the punch keeps the string away from the arc section in a crossbow. The crossbow punch member 36 is typically hingeably mounted on the first panel structure 14 and biased (via a biasing member 43 such as a tension spring or the like (schematically represented in FIG. 11 only by a helical spring)) to abut to a stop (or abutment) member 42 when the structure section 12 is close to and in the closed configuration, as shown in FIG. 12. The free end 44 of the punch member 36 typically includes a plurality of independent free rollers or pulleys 46 adapted to each abut a respective pass of the wire 35 of the tackle member 30. Although not illustrated, the biasing member 43 could be replaced by the last pass of the tackle wire 35 coming from the tackle member 30 on the first panel structure 14 and ending either at the punch member 36 (and not at the free end 44 thereof) or at the first panel structure 14 just after running around a last free roller or pulley 46 of the punch member. Alternatively, the punch member 36 could also be fixed relative to one of the first 14 and second 16 panel structures, and therefore adapted to enter a recess (not shown) extending into the other panel, when in the roof opened configuration.

Figure 11:
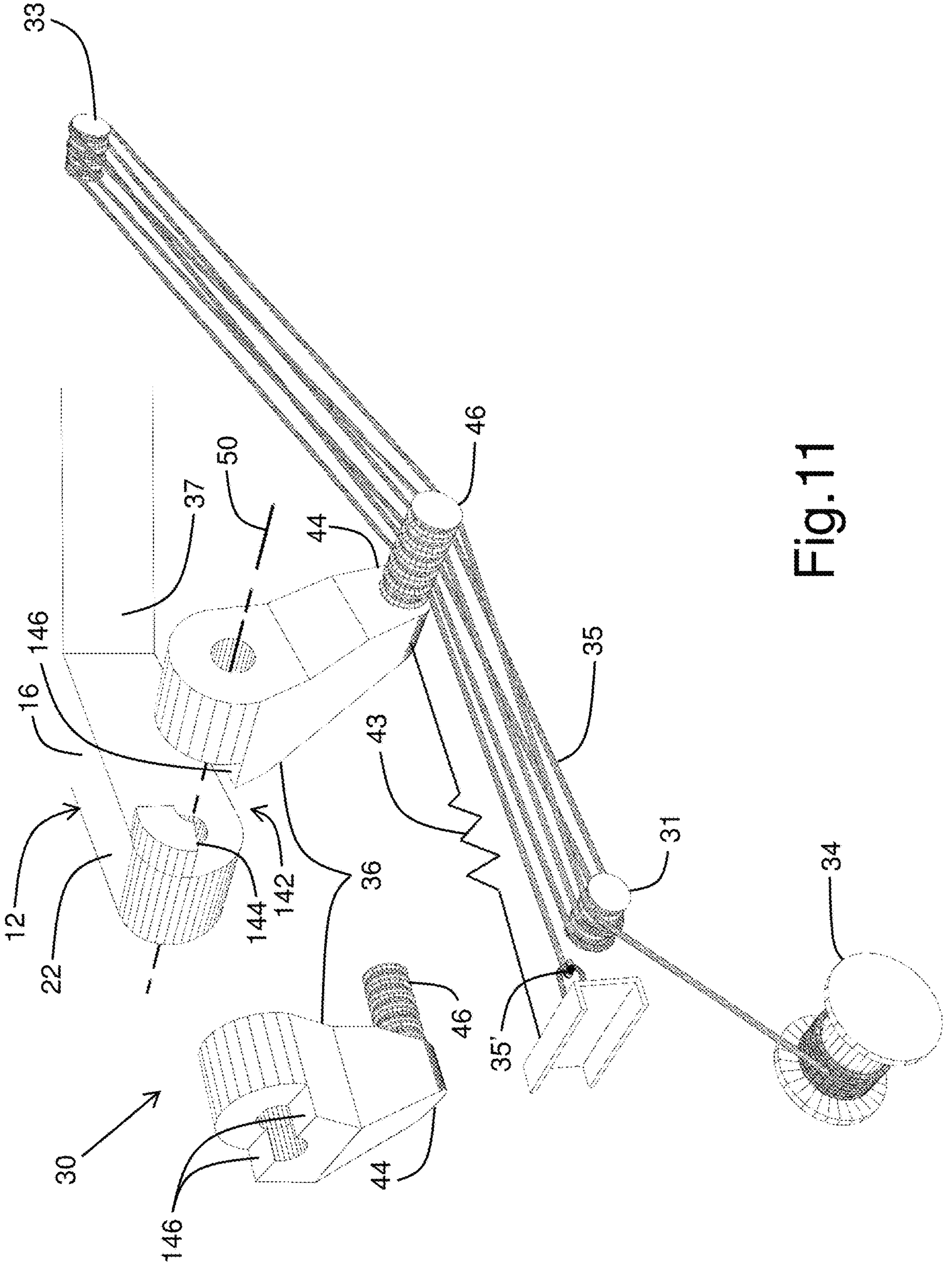
FIG. 11 is a schematic partially broken enlarged top side perspective view of the running path of the wire of the tackle member connecting to the proximal and distal panel structures and engaging the free end of the punch member of FIG. 6.
Figure 12:
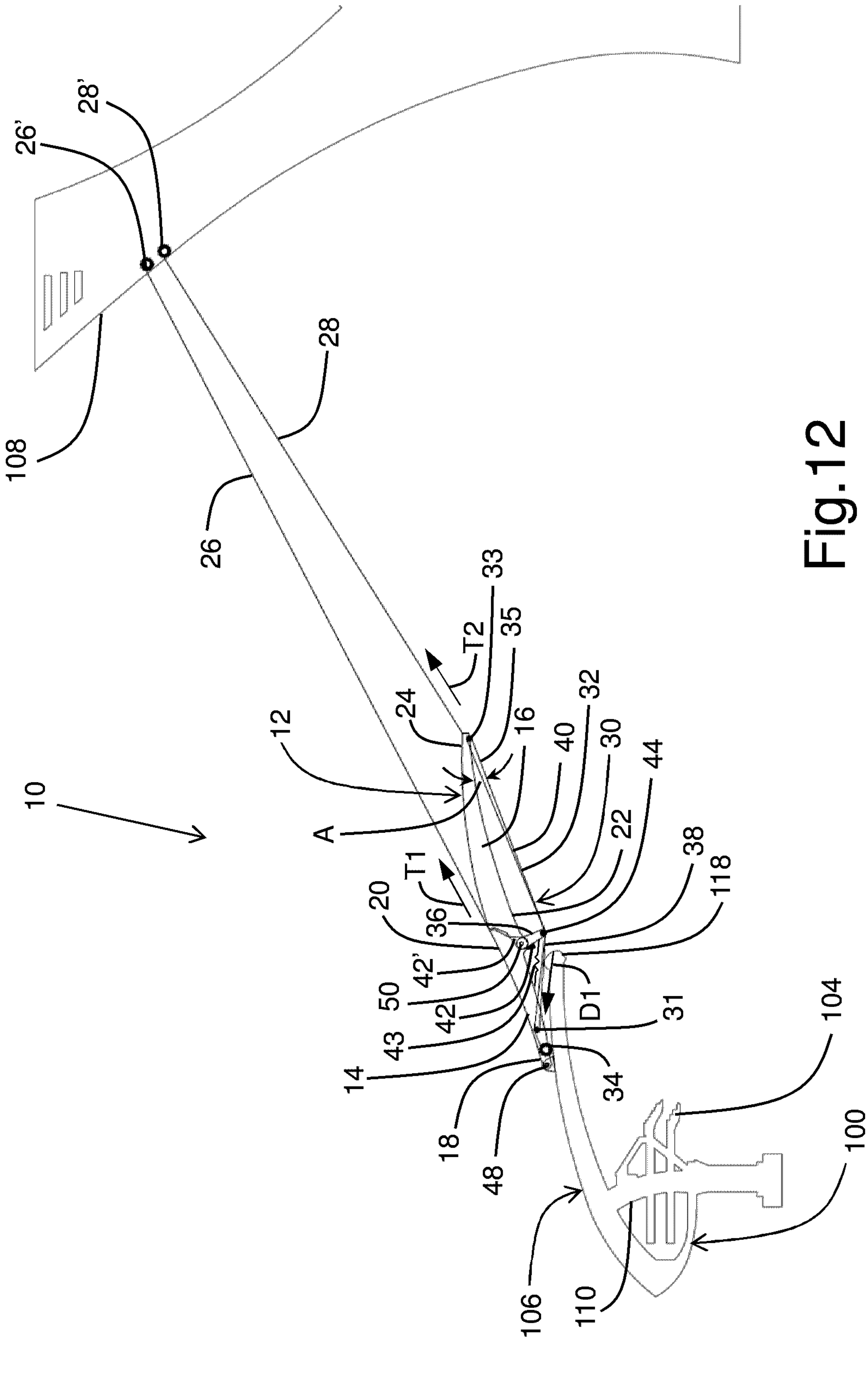
FIGS. 12 to 16 are schematic side elevation views of the roof section of FIG. 6 (and taken along line A-A of FIG. 2), showing the opening sequence of the roof section with the roof section in the roof closed configuration, in the almost closed configuration, at about halfway between the closed and opened configurations, in the almost opened configuration, and in the roof opened configuration, respectively.

FIG. 11 illustrates a schematic view of the running path of the wire 35 of the tackle member 30 connecting at one end to the winch mechanism 34 and the pulleys 31, 33 of the first 14 and second 16 panel structures and engaging the pulleys 46 of the free end 44 of the punch member 36, to end attached to the first panel structure 14 illustrated with anchor member 35'. FIG. 11 also schematically illustrates an alternate abutment member 142 and the biasing member 43. The alternate abutment member 142 is a fixed tenon member 144 protruding from the second panel structure 16 adapted to pivotally engage a larger (angle wise) mortise member 146 formed into the punch member 36 such that the punch member 36 is allowed to pivot between the operating (deployed) position (position shown in FIGS. 6, 7 and 11) under the pulling action of the biasing member 43 and the stowed position into the receiving cavity 37, as further described below. Although three (3) pulleys 31, 33 are shown on each panel structure 14, 16, and six (6) pulleys 46 on the punch member 36 are shown, one skilled in the art would easily understand that the quantity will be dependent on the specific characteristics and configuration of the structure section 12.

Now, turning more specifically to FIGS. 6-16, the opening sequence of a typical structure section 12 of the retractable roof 10 will be detailed in the following paragraphs.

In FIGS. 6-10, a portion of the permanent roof 112 overhanging the grandstands 104 is illustrated with horizontal beams 106 of two adjacent consoles 110 linked together with transversal beams 114 carrying the rigid roof panels 116 of the permanent roof 112. The inner top free ends of all beams 106 are supporting a ring structure 118 carrying technical equipment (not shown) such as spotlights and the like. Furthermore, for clarity purposes, the compression ring structure 109 has been omitted in these FIGS. 6-10.

The structure section 12 has the first proximal end 18 of the first panel structure 14 hingeably mounted on the two beams 106 at the proximal axis 48, and the first distal end 20 hingeably connected to the second proximal end 22 of the second panel structure 16 at the distal axis 50. The second proximal and distal ends 22, 24 of the second panel structure 16 are independently supported by the proximal end 26 and distal end 28 cables, respectively, secured to the tower 108 via proximal 26' and distal 28' motorized winches (see FIGS. 11-15) that maintain predetermined tensions T1, T2 in the two proximal and distal end cables 26, 28, which tensions T1, T2 will independently vary during the opening and closing sequences of the structure section 12. Tensions T1, T2 are controlled via both the angular position of the first panel structure 14 relative to the fixed roof structure 106 of the stadium 100 (about the proximal axis 48), and the angular position of the second panel structure 16 relative to the first panel structure 14 (about the distal axis 50).

The crossbow punch member 36 is typically freely pivotably mounted on the second panel structure 16 adjacent the second proximal end 22, preferably at the distal axis 50. The opposite free end 44 of the crossbow punch member 36 typically includes the plurality of freely mounted pulleys 46, each selectively abutting a respective pass of the wire 35 of the tackle member 30 (location of which could vary on both the proximal 14 and distal 16 panel structures, such as being closer to the proximal axis 48 and the second distal end 24, respectively) when the structure section 12 is adjacent the closed configuration. After the stop (or abutment) member 42 keeps the punch member 36 in fixed position relative to the distal panel structure 16 via the biasing member 43, the crossbow punch member 36 touches or engages the tackle cable 35, such that the punch member 36 always pushes on the tackle wire 35 to force the tackle wire 35 to divide into the first 38 and second 40 angled portions, as shown in FIG. 12, when the first 14 and second 16 panel structures are almost in alignment with one another (or side-by-side to one another). The stop member 42 is preferably located on the distal panel structure 16, extending (preferably from the central hinge bracket 42') on the proximal panel structure side relative to the punch member 36, as shown in FIGS. 12-13, but any other type of stop member could be used.

The opening sequence of each structure section 12 starts with the structure section 12 in the fully closed configuration, as shown in FIGS. 1, 2, 6 and 12, in which the two proximal end 26 and distal end 28 cables are in tension T1 and T2 respectively. The winch mechanism 34, typically located close to the proximal axis 48, is activated to start winding up the tackle wire 35 (acting similarly to a tendon in biology—see direction D1 in FIG. 12) and thereby initiate the displacement of the two panel structures 14, 16 toward each other, by forcing the upward displacement of the distal axis 50 via the tackle wire 35 pushing on the crossbow punch member 36. The motorized distal winch 28' of the distal end cable 28 simultaneously controls the unwinding of the distal end cable 28 to maintain the tension T2 required to support the structure section 12 during the opening of the structure section 12. Throughout the entire opening sequence, as well as the closing sequence, the tensions T1 and T2 always ensure a dynamic stability of the structure section 12, as well as accounting for possible wind effects that could otherwise suddenly and momentarily loosen either one or both tensions T1 and T2 close to zero (and therefore jeopardize the smoothness of the sequence).

Figure 7:
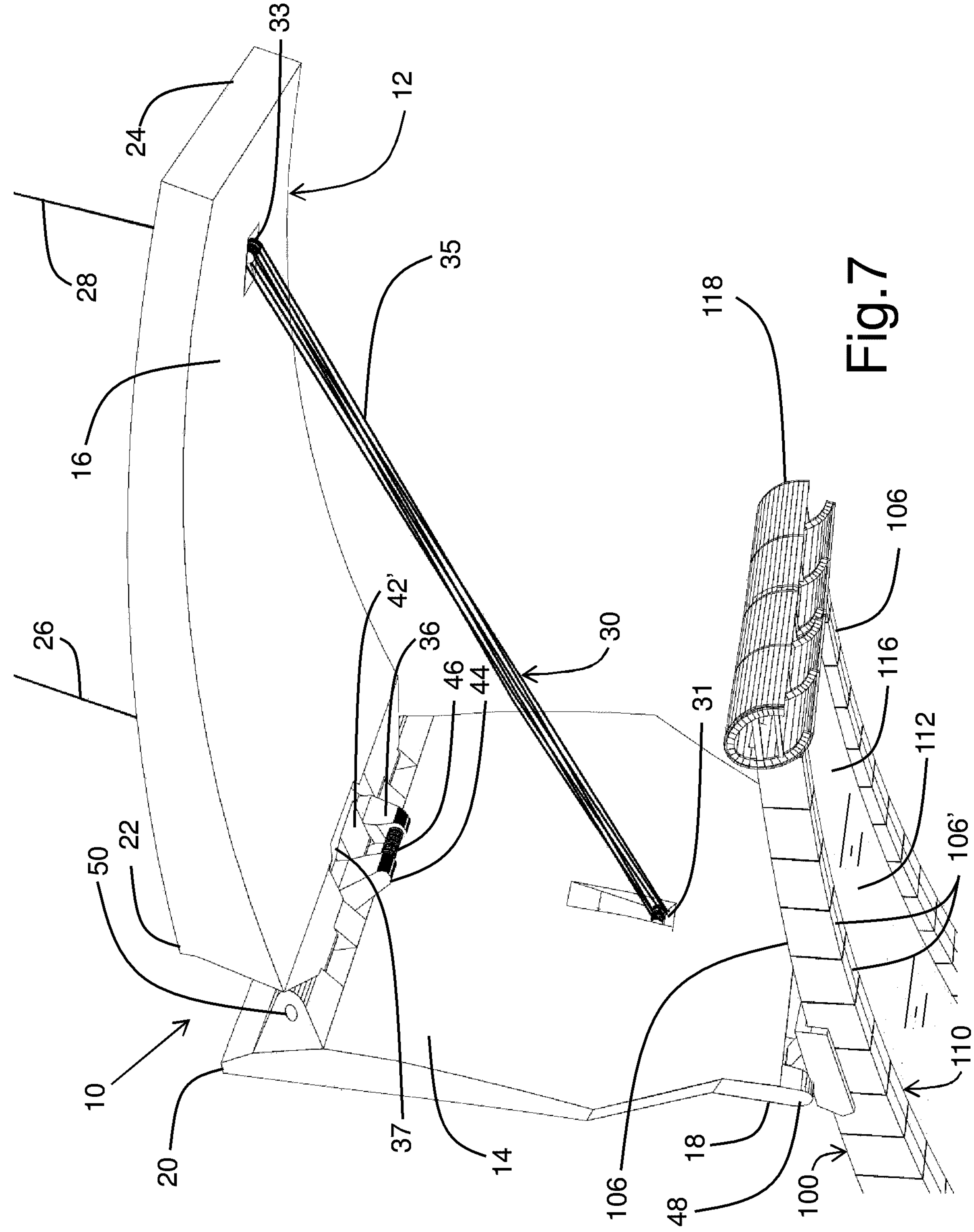
FIG. 7 is a partially broken enlarged side bottom perspective view of the roof section of FIG. 6, at the beginning of the opening sequence (or the end of the closing sequence)
Figure 13:
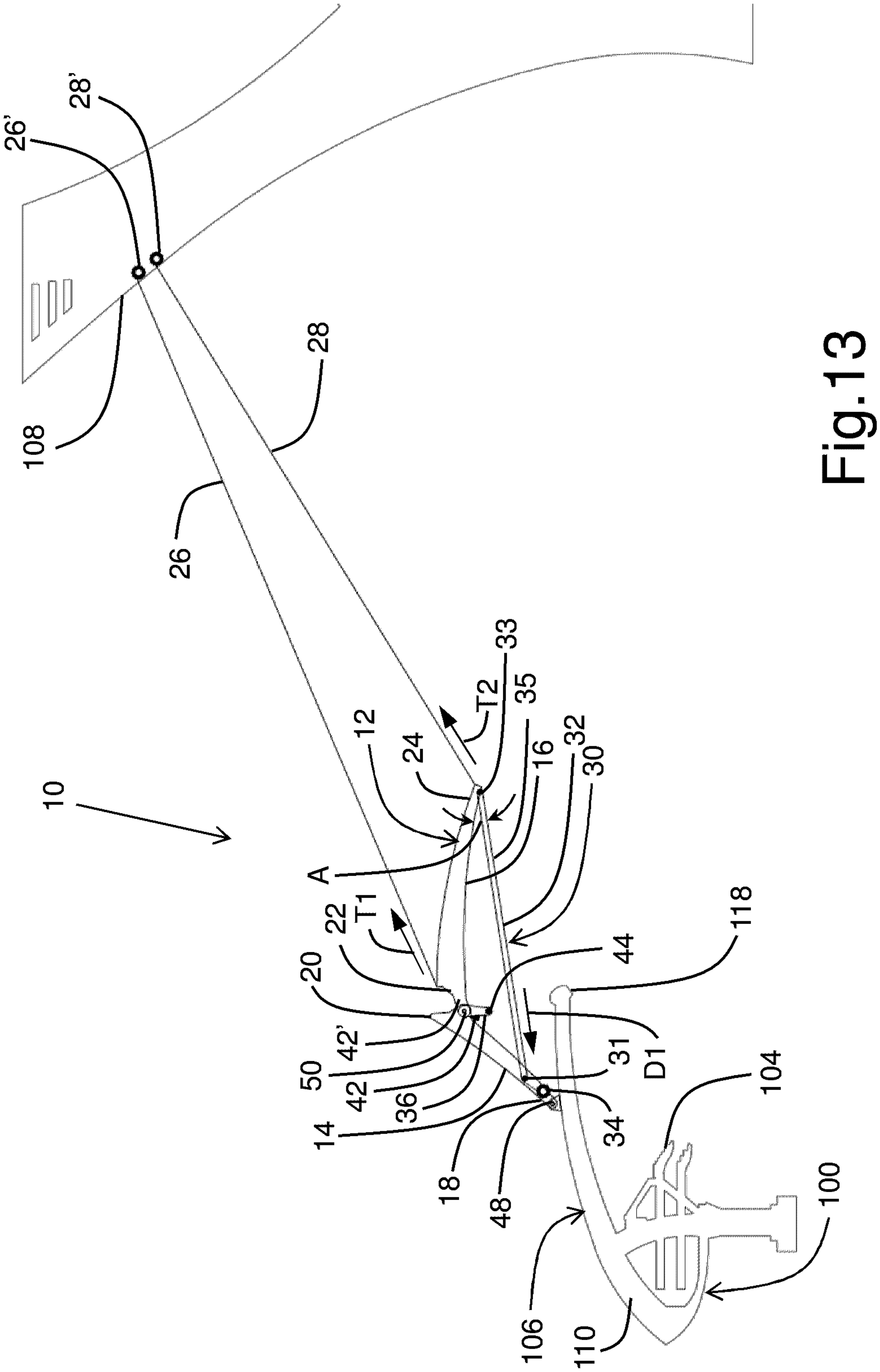

During the folding of the structure section 12, as illustrated in FIGS. 7 and 13, the motorized proximal winch 26' of the proximal end cable 26 simultaneously controls the unwinding of the proximal end cable 26 that allows for the tension T1 to induce a moment opposite to the tipping (or flipping) motion of the entire structure section 12 (when the resulting moment of the center of gravity of the two panel structures 14, 16 of the structure section 12 passes over the proximal axis 48, horizontally from one side to other, i.e. during the change of its rotational direction about the proximal axis 48) to ensure dynamic stability during the opening sequence. The two panel structures 14, 16 act as a triangular beam having the proximal corner hingeably mounted to the supporting frame 106 (at proximal axis 48) and the distal corner linked to the high structure 108 via the distal end cable 28, and, because of the dynamic stability effect of the structure section 12 about the proximal axis 48, the middle third corner also linked to the high structure 108 via the distal end cable 26.

Figure 8:
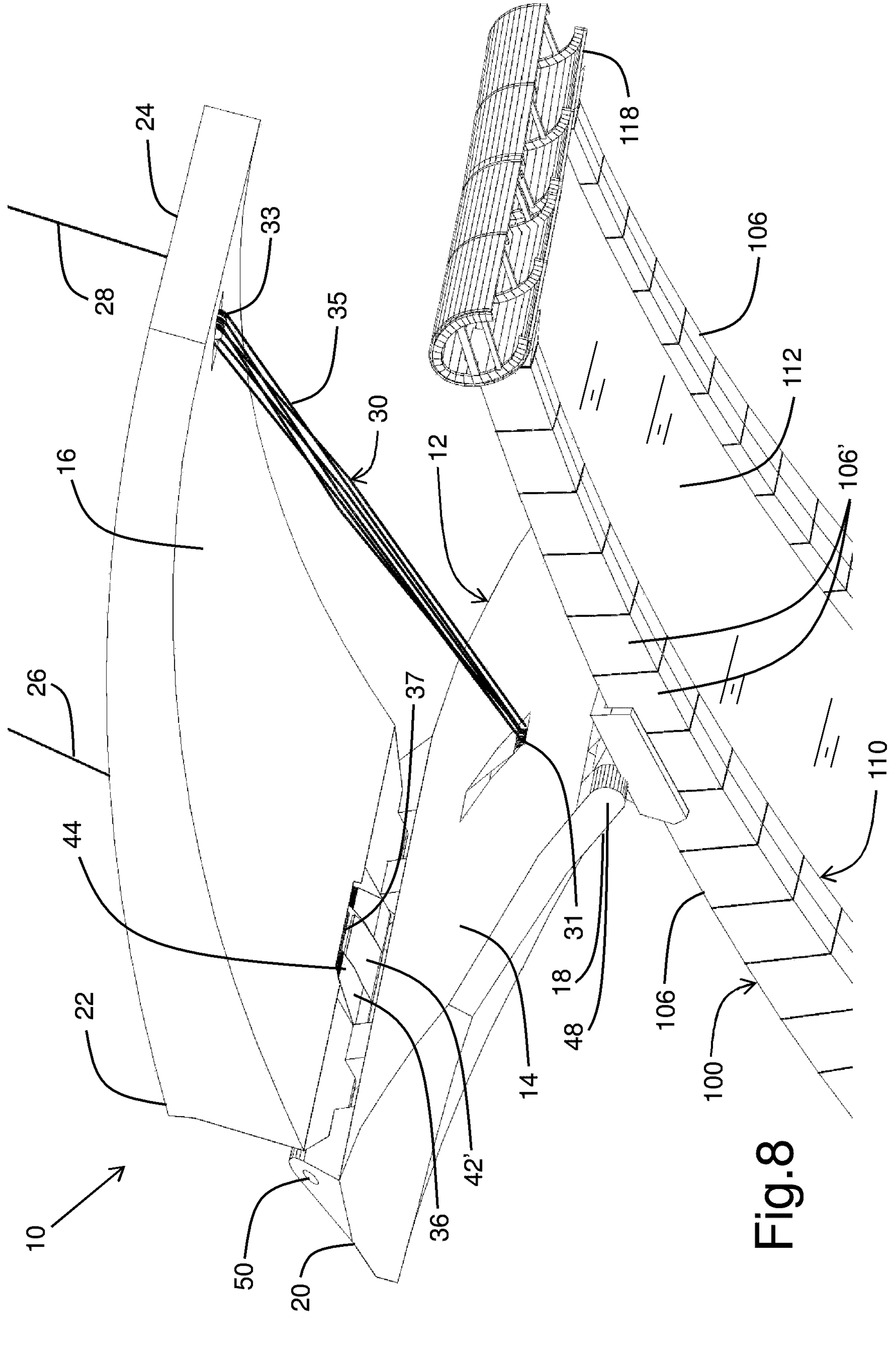
FIG. 8 is a partially broken enlarged side bottom perspective view of the roof section of FIG. 6, at the end of the opening sequence (or the beginning of the closing sequence)
Figure 14:
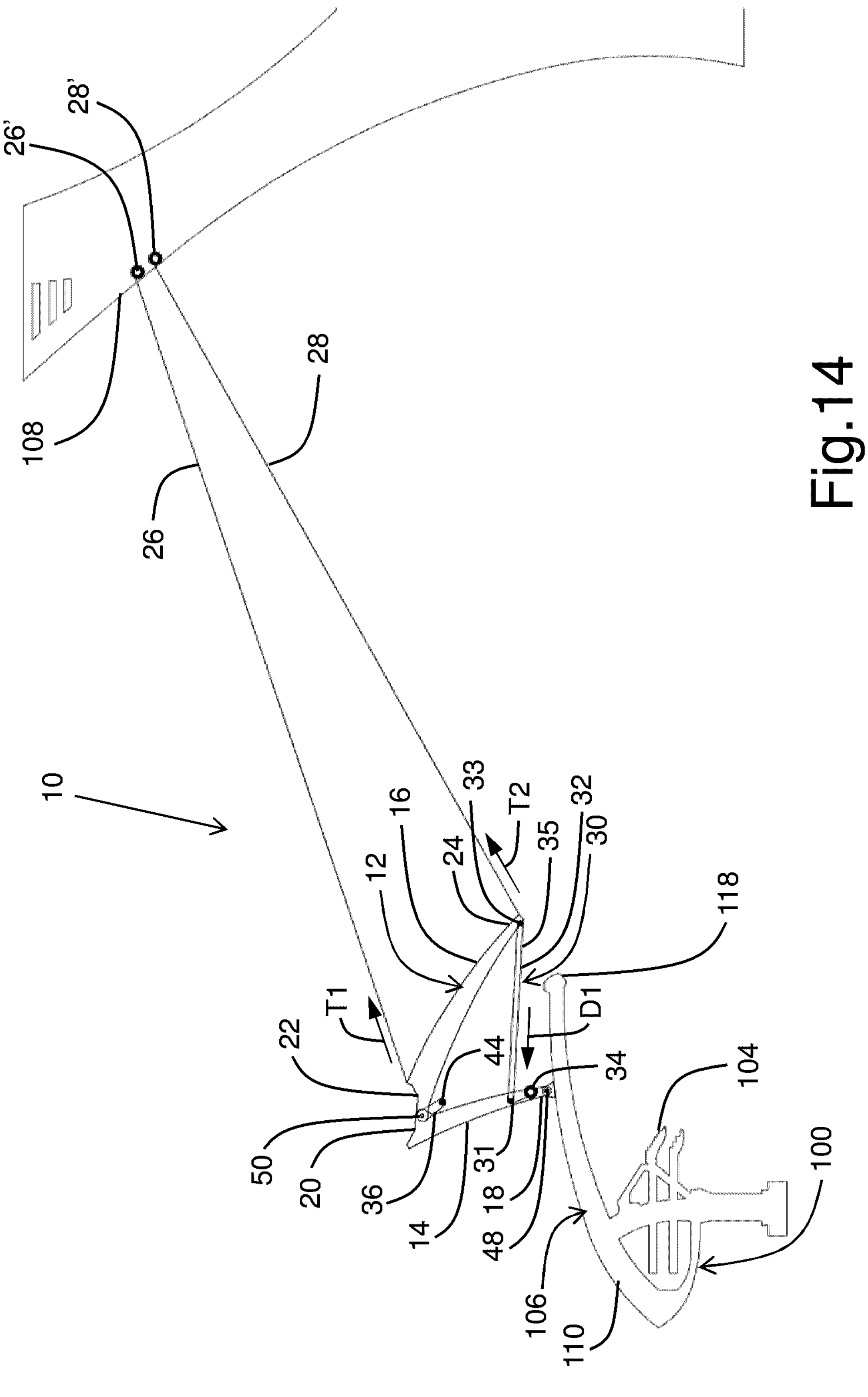

Up to about a position of the section structure 12 illustrated in FIGS. 8 and 14, the motorized distal winch 28' of the distal end cable 28 controls the movement of the structure section 12. This control is gradually transferred to the motorized proximal winch 26' of the proximal end cable 26 up to about the position of the structure section 12 illustrated in FIG. 15. From about that position illustrated in FIG. 15, the motorized proximal winch 26' of the proximal end cable 26 controls the movement of the structure section 12, while the motorized distal winch 28' of the distal end cable 28 simply maintains a tension T2 in the distal end cable 28 to induce a moment opposite to the folding motion to ensure dynamic stability during the remaining of the opening sequence up to the opened configuration shown in FIGS. 10 and 16 (and almost in FIG. 9). Also, from about that position shown in FIG. 14, a second stop member (the first panel structure itself or any other not shown), typically extending from the proximal panel structure 14, abuts to the crossbow punch member 36 to force it to pivot towards the distal panel structure 16, against the biasing member 43, and to typically engage into a corresponding receiving cavity 37 extending into the distal panel structure 16. In the roof opened configuration shown in FIGS. 10 and 16 (and almost in FIG. 9), the proximal 14 and distal 16 panel structures fold generally on top of one another.

Figure 15:
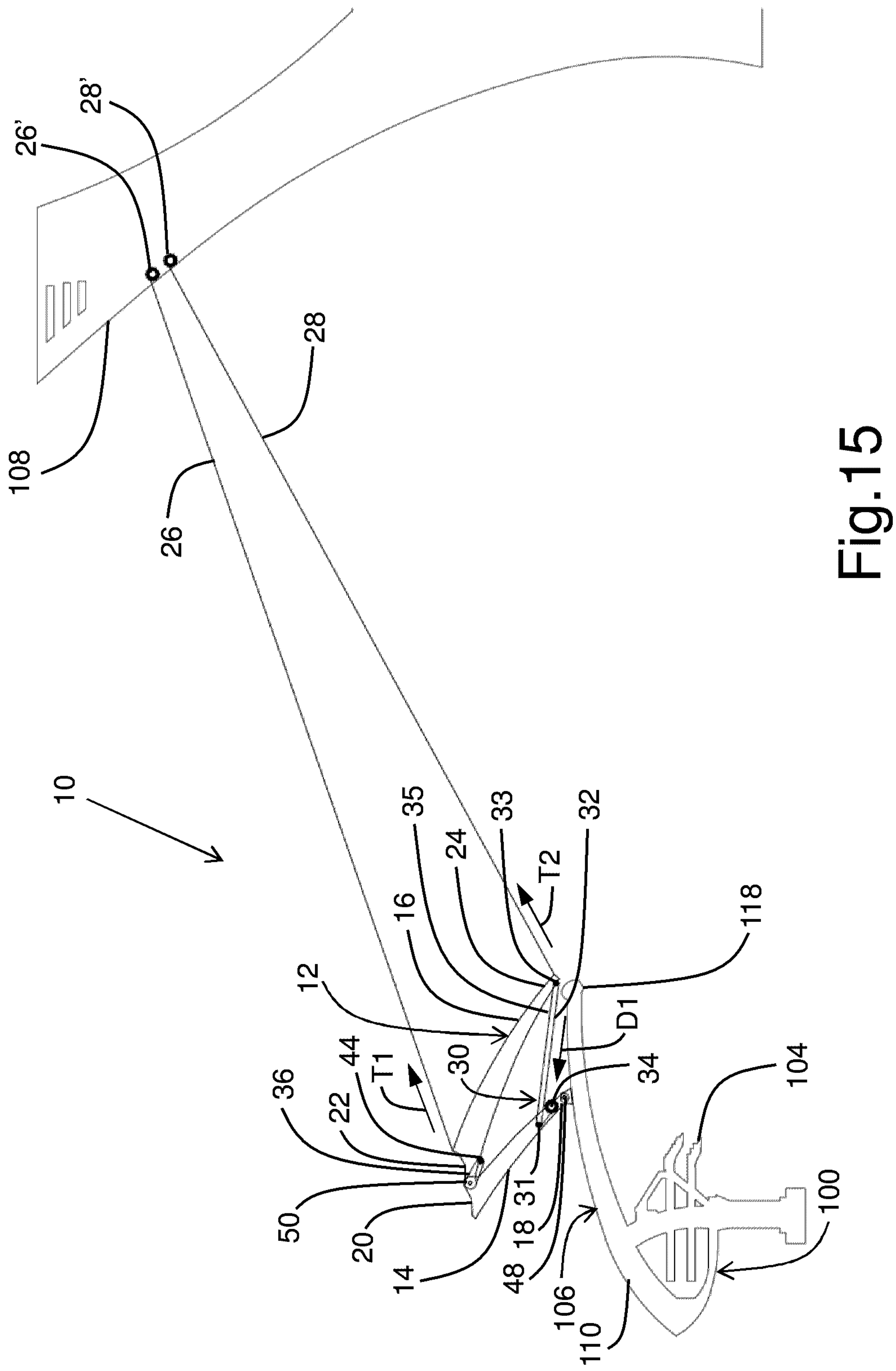

The schematics of both FIGS. 14 and 15 illustrate well the balance provided by both motorized winches 26', 28' that control respective tensions T1, T2 of end cables 26, 28 which induce opposite moments relative to the hinge proximal axis 48 of the structure section 12 all along during the folding and tipping of the panel structures 14, 16.

Figure 9:
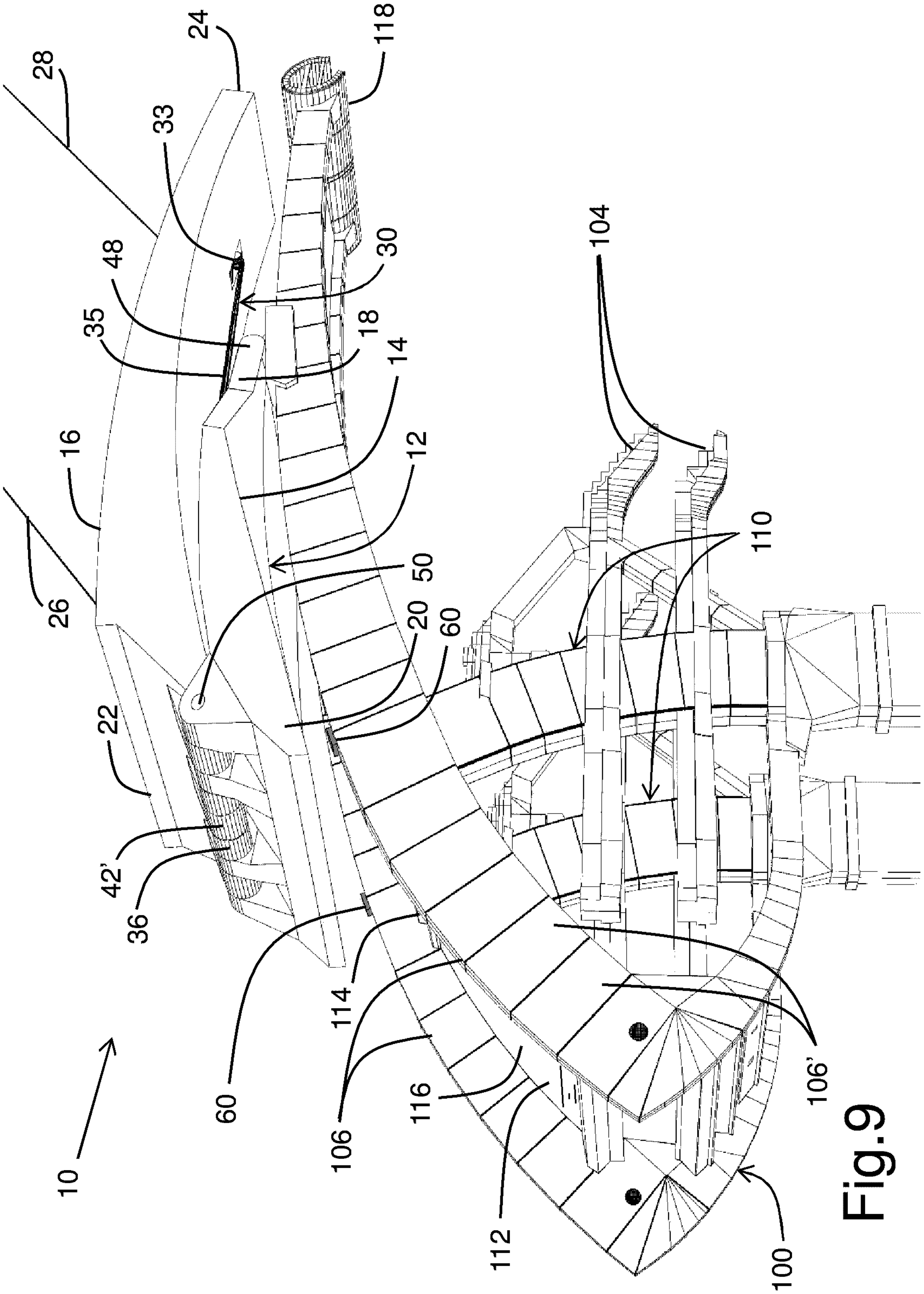
FIG. 9 is a partially broken enlarged rear bottom perspective view of the roof section of FIG. 6, almost in the roof opened configuration.
Figure 10:
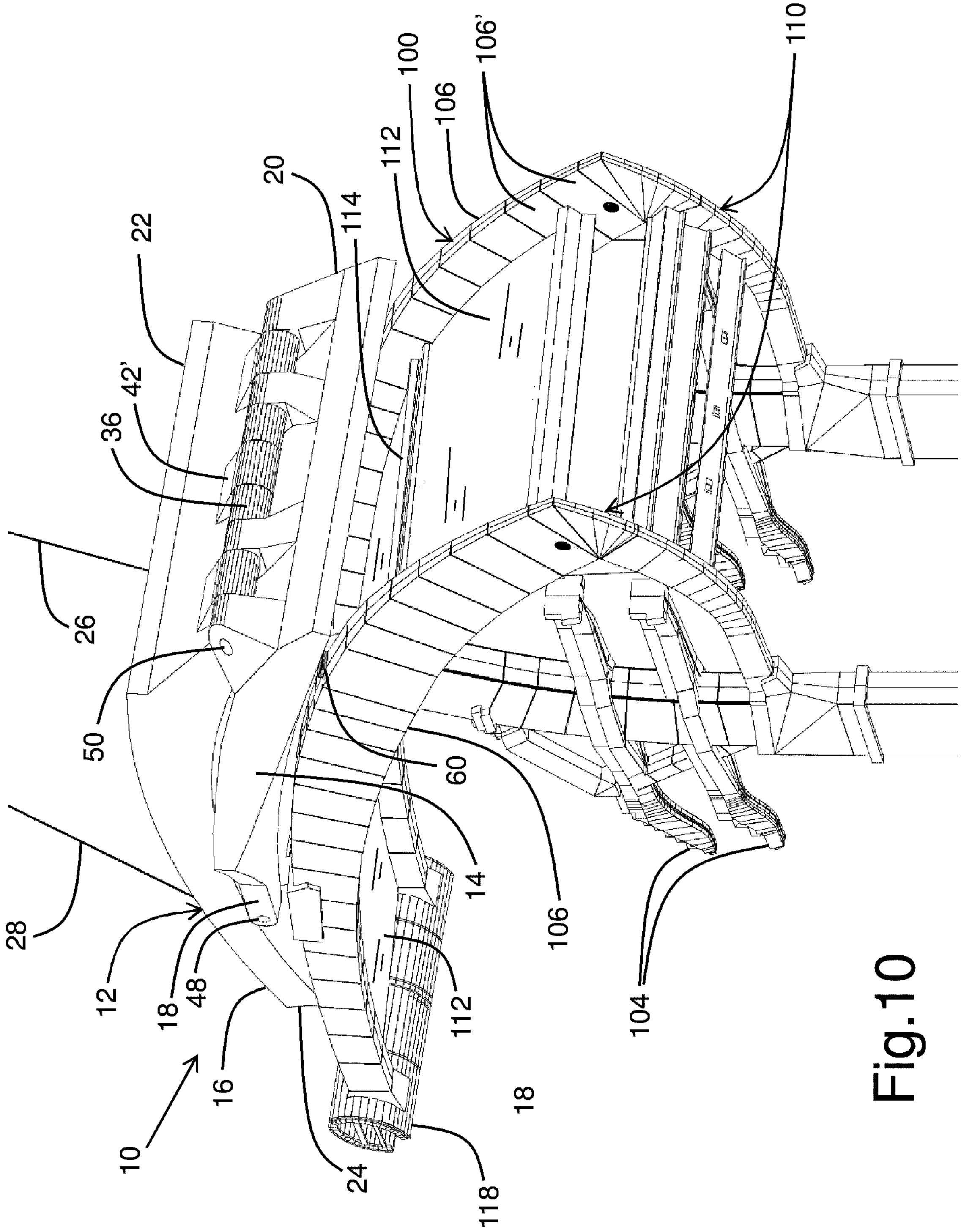
FIG. 10 is a partially broken enlarged rear bottom perspective view of the roof section of FIG. 6, in the roof opened configuration.
Figure 16:
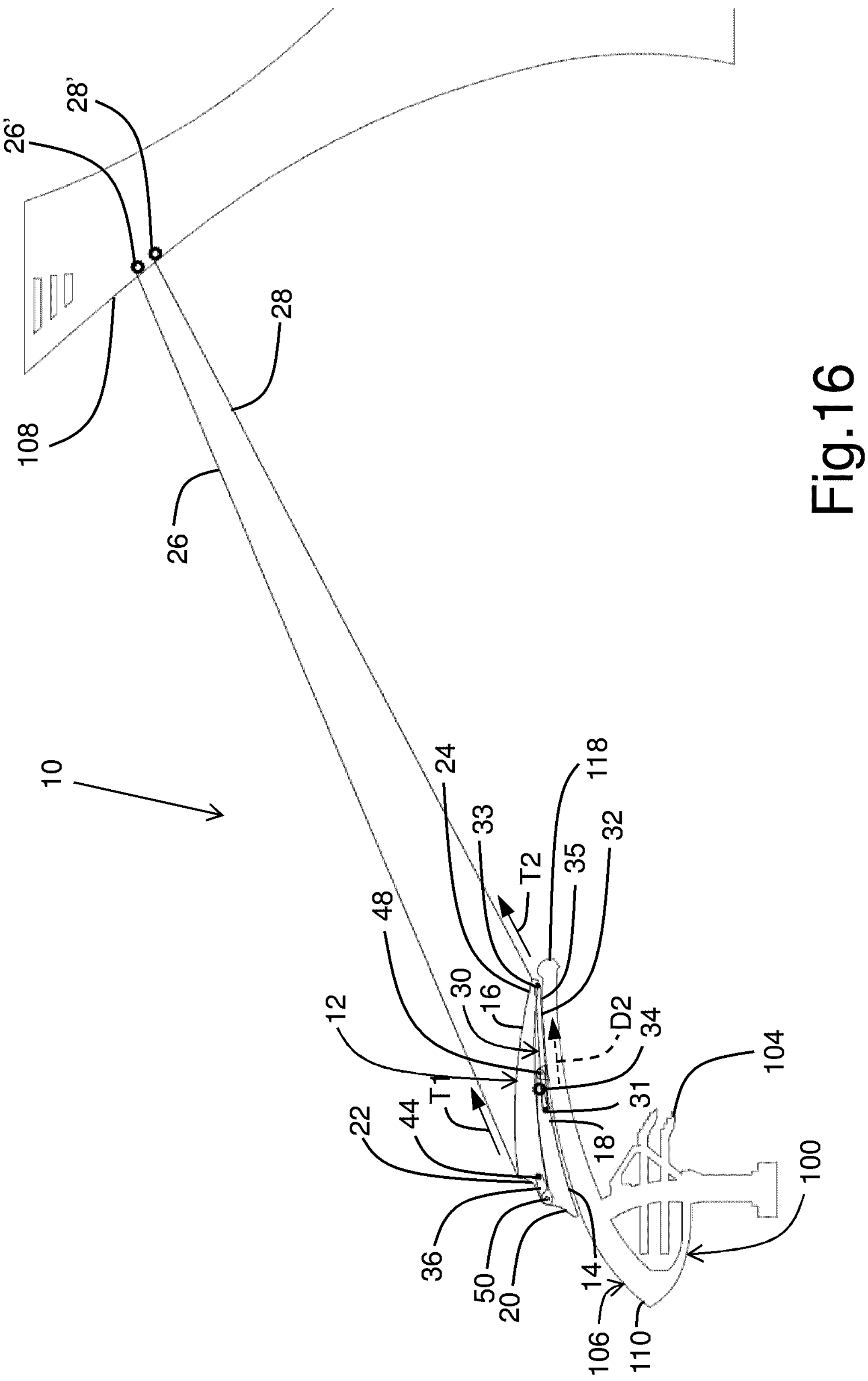

In the roof closed configuration illustrated in FIGS. 10 and 16, and almost in FIG. 9, although not required (because of the tension provided in the end cables 26, 28 that maintain static stability of the structure section 12), rest supports 60 could be mounted on the horizontal beams 106 of consoles 110 adjacent the first proximal end 20 to allow the first proximal end 20 to 'sit' onto the consoles 110.

In the closing sequence, the movement of the structure section 12 is initiated by the motorized proximal winch 26' of the proximal end cable 26, while the winch mechanism 34 controls the unwinding of the tackle wire 35 (see direction D2 in FIG. 16) to allow the deployment of the two panel structures 14, 16. During this time, the simultaneous controlled winding of the distal end cable 28 by the motorized distal winch 28' allows for the tension T2 to induce a moment opposite to the unfolding motion of the entire structure section 12 to ensure dynamic stability during the closing sequence, and the 'forward' tilting of the entire structure section 12, thereby maintaining the triangular shape throughout the sequence.

From there on, the steps illustrated in FIGS. 12 to 16 are essentially sequentially reversed. Accordingly, between about the positions illustrated in FIGS. 15 and 14, the control of the movement is gradually transferred from the motorized proximal winch 26' of the proximal end cable 26 to the motorized distal winch 28' of the distal end cable 28. Tension T2 in the distal end cable 28 ensures the 'forward' tilting of the entire structure section 12, while maintaining its triangular shape throughout the sequence, especially when the distal axis 50 is tipping over the proximal axis 48. From about the position illustrated in FIG. 14 up to the closing configuration of FIG. 12, the motorized distal winch 28' controls the tipping movement of the structure section 12 while the winch mechanism 34 controls the unwinding and elongation of the tackle wire 35 (acting similarly to a tendon in biology) including the pushing of the tackle wire 35 by the pulleys 46 at the free end 44 of the crossbow punch member 36, under the action of the biasing member 43, that is prevented from further free rotation about the distal axis 50 by the stop member 42. The abutment of the punch member 36 to the stop member 42 occurs before the free end 44 touches the tackle wire 35, such that the force applied to the punch member 36 by the tackle wire 35 keeps the punch member 36 in abutment against the stop member 42. Essentially, at the end of the closing sequence, the tension T2 in the distal end cable 28 controls the position of the structure section 12 while the tension in the tackle wire 35 controls the 'opening' of the triangular shape.

The tensions T1, T2 of the two proximal 26 end distal 28 end cables ensure both the dynamic stability of the structure section 12 during the closing and opening sequences, and the static stability of the structure section 12 in the roof closed and opened configurations.

Since the tower 108, in the present case (Montreal stadium 100), is not in line with each structure sections 12 (each structure section 12 is generally oriented towards the center of the stadium 100 rather than the tower 108), the tensions in the proximal 26 and distal 28 end cables induce a lateral force on the structure section 12, and in turn onto the corresponding supporting consoles 110 pulling the consoles 110 towards the tower 108. In order to compensate for that lateral force, each structure section 12 is connected to a lateral cable 29 (shown only on one structure section 12 in FIG. 3 for clarity purposes) pulling on the structure section essentially in the opposite lateral direction (than the tower 108) towards a compression ring structure 109 abutting to and transferring all of the effort to the base of the tower 108.

Preferably, to protect the playing field 102 or the like from the elements (sunrays, rain, snow, wind, etc.) and/or allow a controlled environment (air temperature, pressure, humidity, etc.) inside the stadium 100, each structure section 12 typically, and preferably sealably, partially overlaps an adjacent structure section 12 to provide a sealing interface there between. For air sealing, there could be a seal joints or the like (not shown) between adjacent structure sections 12, and for water, there are gutters or the like (not shown) running all along the interfaces to ensure proper and efficient water drainage. Although not illustrated, in case of an abnormal heavy snow fall, the second distal end 24 of the distal panel structures 16 could selectively be tilted further down about the distal axis 50 than the closed configuration to allow the snow accumulated thereon to slide and fall onto the playing field 102.

Figure 3:
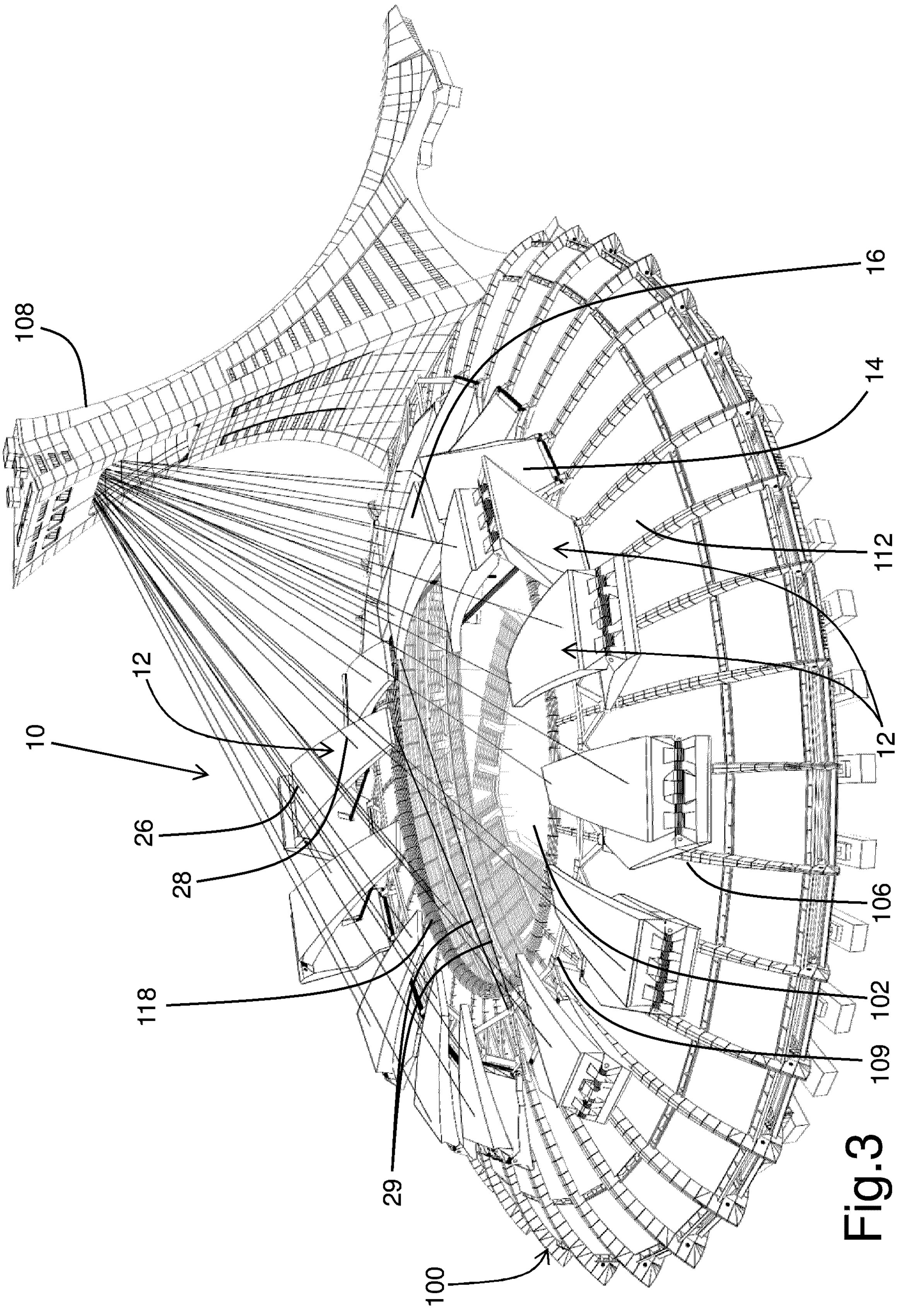
FIG. 3 is a pictorial top perspective view of the embodiment of FIG. 1, with some sections of the retractable roof in the roof closed configuration, some sections in the roof opened configuration, and some sections between the closed and opened configurations.
Figure 4:
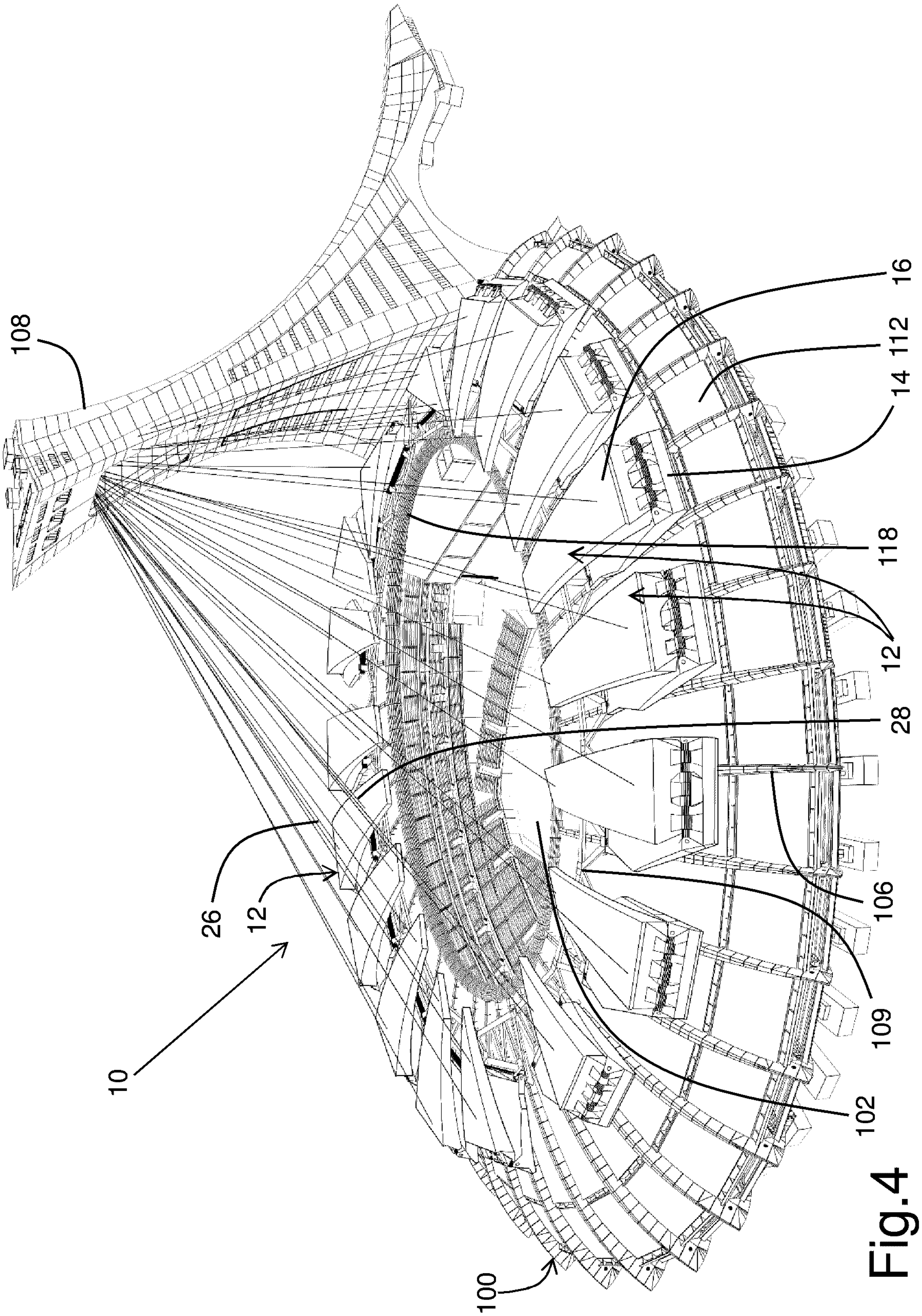
FIG. 4 is a pictorial top perspective view of the embodiment of FIG. 1, with the retractable roof in the roof opened configuration.
Figure 5:
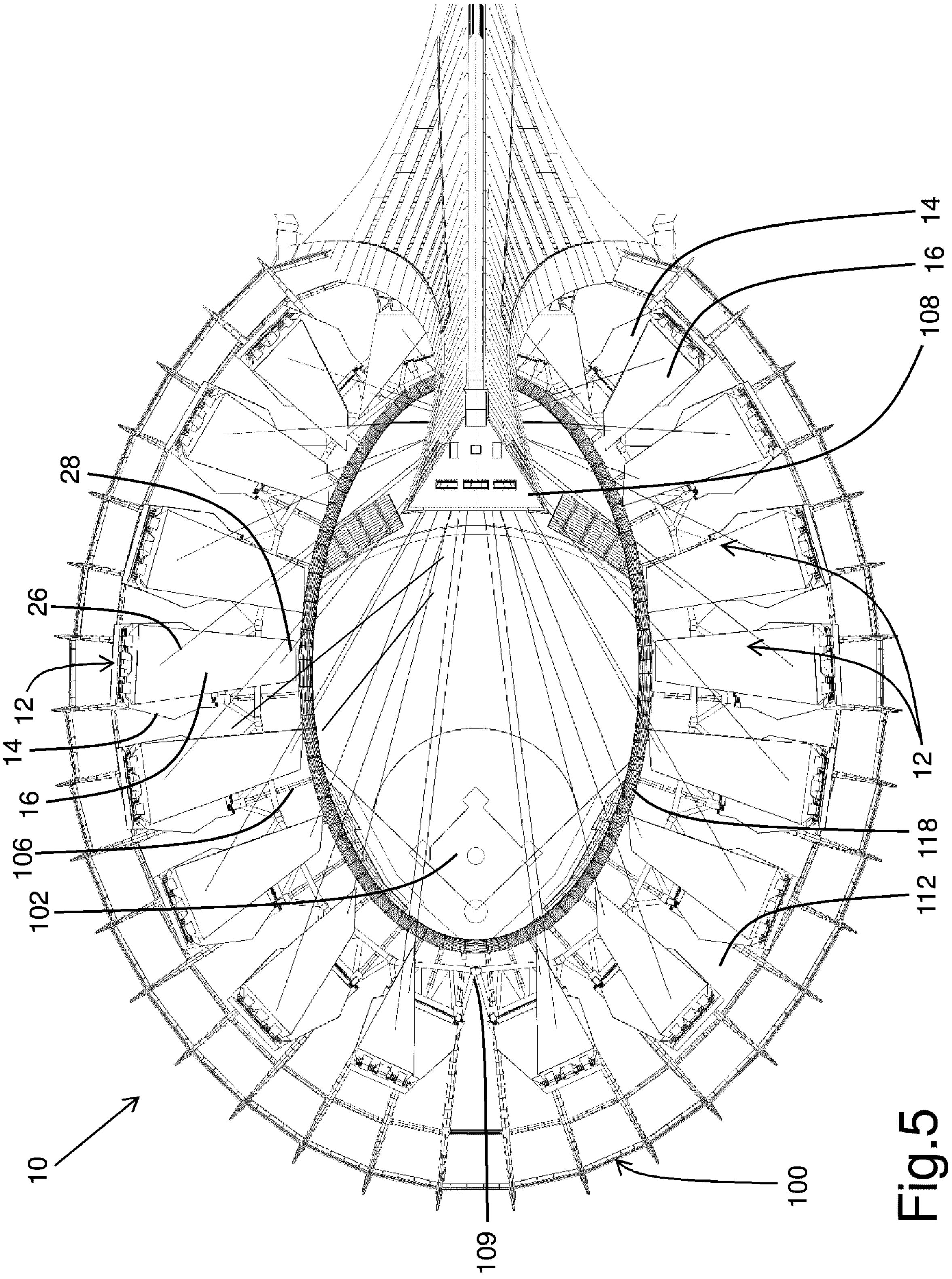
FIG. 5 is a pictorial top plan view of the embodiment of FIG. 4.
Figure 6:
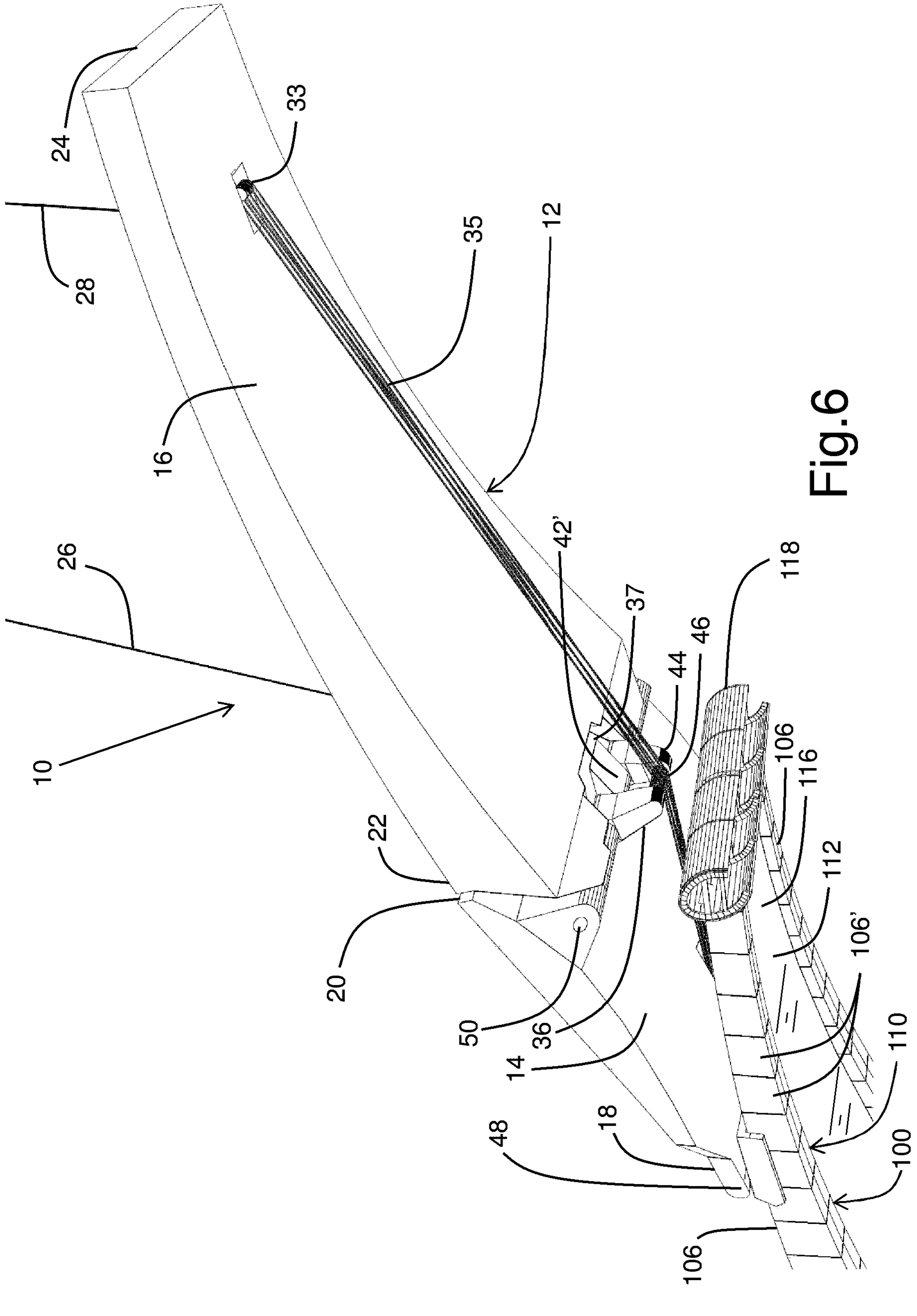
FIG. 6 is a partially broken enlarged side bottom perspective view of a roof section of the embodiment of FIG. 1, in the roof closed configuration.

The sealing interface between adjacent structure sections 12, as well as the positioning of the different end cables 26, 28 of each structure section 12, depending on the actual configuration of the retractable roof 10, would typically determine the sequential opening (and reverse closing) of the successive structure sections 12, as illustrated in FIG. 3.

Although not illustrated, one skilled in the art would readily realize that, without departing from the scope of the present invention, the first panel structure 16 could simply be a truss-like structure, without any surface panels, as it be positioned not to close off or cover the opening in the existing roof 112 of the stadium 100 in the closed configuration.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

The invention claimed is:

1. A retractable roof for a building having a supporting frame and a building structure extending vertically above the supporting frame, said retractable roof comprising:

at least one structure section including first and second panel structures, said first panel structure having a first proximal end being hingeably mountable on the supporting frame at a proximal hinge and a first distal end hingeably connecting to a second proximal end of the second panel structure at a distal hinge, a second distal end of said second panel structure being suspended to the building structure with a distal end cable connected to a distal motorized winch;

a tackle member connecting to both said first and second panel structures of said at least one structure section adjacent said first proximal end and said second distal end, respectively, and including a tackle wire forming a wire side of a triangular cross-sectional shape with said first and second panel structures; and a tackle winch connecting to the tackle member to control a wire length of the wire side.

2. The retractable roof of claim 1, further including one of said first distal end and second proximal end being independently suspended to the building structure with a proximal end cable connected to a proximal motorized winch.

3. The retractable roof of claim 2, wherein said second proximal end is independently suspended to the building structure with the proximal end cable.

4. The retractable roof of claim 2, further including a tackle wire punch mounted on one of said first and second panel structures, said tackle wire punch selectively abutting to and dividing said tackle member into first and second angled portions so as to maintain a minimum predetermined internal distal angle of said triangular shape between the tackle wire and the distal panel structure.

5. The retractable roof of claim 4, wherein said minimum predetermined internal distal angle between the tackle wire and the distal panel structure is at least ten (10) degrees.

6. The retractable roof of claim 4, wherein said tackle wire punch is hingeably mounted on said distal hinge.

7. The retractable roof of claim 6, wherein said tackle wire punch includes a biasing member biasing said tackle wire punch towards said first panel structure.

8. The retractable roof of claim 7, wherein said tackle wire punch includes a stop stopping displacement of said tackle wire punch under via said biasing member when said tackle wire punch engages said tackle wire.

9. The retractable roof of claim 2, wherein said first and second panel structure extend generally side-by-side to one another when the retractable roof is in a roof closed configuration, and on top of one another when the retractable roof is in a roof opened configuration.

10. The retractable roof of claim 9, wherein the wire length of said wire side of said tackle wire, along with respective proximal and distal tensions in said proximal and distal end cables and proximal and distal lengths of said proximal and distal end cables control displacement and dynamic stability of said first and second panel structures between said roof closed and opened configurations, and static stability of said first and second panel structures at said roof closed and opened configurations.

11. The retractable roof of claim 1, wherein the retractable roof includes a plurality of structure sections positioned adjacent one another to form said retractable roof.

12. The retractable roof of claim 11, wherein adjacent ones of said plurality of structure sections partially overlap one another to ensure sealing of the retractable roof.

* * * * *